US012551412B2

(12) United States Patent
Mintenko

(10) Patent No.: US 12,551,412 B2
(45) Date of Patent: Feb. 17, 2026

(54) BABY BOTTLE WITH SYRINGE RECEIVER

(71) Applicant: Daniela Mintenko, Irvine, CA (US)

(72) Inventor: Daniela Mintenko, Irvine, CA (US)

( * ) Notice: Subject to any disclaimer, the term of this patent is extended or adjusted under 35 U.S.C. 154(b) by 0 days.

(21) Appl. No.: 18/734,975

(22) Filed: Jun. 5, 2024

(65) Prior Publication Data

US 2025/0375357 A1 Dec. 11, 2025

(51) Int. Cl.
*A61J 9/00* (2006.01)
*A61J 11/00* (2006.01)

(52) U.S. Cl.
CPC ............... *A61J 9/00* (2013.01); *A61J 11/008* (2013.01)

(58) Field of Classification Search
CPC ............. A61J 9/00; A61J 11/04; A61J 7/0053
USPC ................................................ 215/11.1, 11.4
See application file for complete search history.

(56) References Cited

U.S. PATENT DOCUMENTS 4,821,895 A * 4/1989 Roskilly ............... A61J 7/0053 215/390
5,244,122 A * 9/1993 Botts ......................... A61J 9/00 D24/114
5,383,906 A * 1/1995 Burchett ............... A61J 7/0053 604/82
9,663,285 B2 * 5/2017 Albaum ............. B65D 81/3227
9,770,393 B2 * 9/2017 Zhou .......................... A61J 9/04
10,881,587 B2 * 1/2021 Shastri ..................... A61J 11/02
11,026,867 B2 * 6/2021 Smith ....................... A61J 9/06
2016/0199262 A1 * 7/2016 Itzek ........................ A61J 11/02 215/11.1
2023/0240946 A1 * 8/2023 Hunter ................. A61J 11/0005 215/11.1

* cited by examiner

*Primary Examiner* — Sue A Weaver
(74) *Attorney, Agent, or Firm* — Legalforce RAPC Worldwide

(57) ABSTRACT

In an embodiment, there is provided a bottle which contains liquid milk and dispenses liquid medication, comprising a bottle, wherein the bottle is defined by a cylindrical body with a top end and a bottom end, and wherein the cylindrical body contains a central passage; a cap attached to a nipple, wherein the cap has a top end and a bottom end, wherein the nipple has a tapered end and a non-tapered end, and wherein the non-tapered end of the nipple is attached to the top end of the cap; a sealed vacuum, wherein the sealed vacuum is of conical shape and wherein the sealed vacuum contains a central passage; and a syringe, wherein the syringe is defined by a top tapered end and a bottom end, wherein the syringe lies in the central passage of the bottle, wherein the top tapered end is contained within the mixing chamber of the nipple through the central passage of the sealed vacuum and wherein the bottom end features a plunger.

3 Claims, 19 Drawing Sheets

BABY BOTTLE WITH SYRINGE RECEIVER

TECHNICAL FIELD OF THE INVENTION

The present invention relates in general to baby bottles, and, more specifically, to a baby bottle with syringe receiver.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Parents may face several challenges in attempting to give their children medication when their children are ill. There are several reasons for this.

First, generally, children may dislike taking medications. Second, children may be uncomfortable with administration of medication via a syringe. Third, children may become unsettled by the sight of the syringe that they now associate with the impending delivery of medication. Fourth, current methods of administering medication to children are cumbersome, messy, and difficult to precisely know the quantity of medication received if there is any spillage or spit up during administration of the medication In an embodiment, there is provided a bottle which contains liquid milk and dispenses liquid medication, comprising a bottle, wherein the bottle is defined by a cylindrical body with a top end and a bottom end, and wherein the cylindrical body contains a central passage; a cap attached to a nipple, wherein the cap has a top end and a bottom end, wherein the nipple has a tapered end and a non-tapered end, and wherein the non-tapered end of the nipple is attached to the top end of the cap; a sealed vacuum, wherein the sealed vacuum is of conical shape and wherein the sealed vacuum contains a central passage; and a syringe, wherein the syringe is defined by a top tapered end and a bottom end, wherein the syringe lies in the central passage of the bottle, wherein the top tapered end is contained within the mixing chamber of the nipple through the central passage of the sealed vacuum and wherein the bottom end features a plunger. It is to these ends that the present invention has been developed.

BRIEF SUMMARY OF THE INVENTION

To minimize the limitations in the prior art, and to minimize other limitations that will be apparent upon reading and understanding the present specification, the present invention describes a baby bottle with syringe receiver.

It is an objective of the present invention to provide a baby bottle with syringe receiver that may comprise a bottle.

It is another objective of the present invention to provide a baby bottle with syringe receiver that may comprise a main body.

It is another objective of the present invention to provide a baby bottle with syringe receiver that may comprise a central passage.

It is another objective of the present invention to provide a baby bottle with syringe receiver that may comprise a nipple.

It is another objective of the present invention to provide a baby bottle with syringe receiver that may comprise a body cap.

It is another objective of the present invention to provide a baby bottle with syringe receiver that may comprise a one way valve.

It is another objective of the present invention to provide a baby bottle with syringe receiver that may comprise a nipple cap.

It is another objective of the present invention to provide a baby bottle with syringe receiver that may comprise a syringe body.

It is another objective of the present invention to provide a baby bottle with syringe receiver that may comprise a syringe plunger.

It is another objective of the present invention to provide a baby bottle with syringe receiver that may comprise a resilient material of construction.

It is another objective of the present invention to provide a baby bottle with syringe receiver that may comprise a water-proof material of construction.

It is another objective of the present invention to provide a baby bottle with syringe receiver that may comprise a reusable material of construction.

It is another objective of the present invention to provide a baby bottle with syringe receiver that may comprise a washable material of construction.

It is another objective of the present invention to provide a baby bottle with syringe receiver that may comprise a multi-component construction.

It is another objective of the present invention to provide a baby bottle with syringe receiver that may comprise an antimicrobial layer.

It is another objective of the present invention to provide a baby bottle with syringe receiver that may comprise an antimicrobial material of construction.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 1 is a front elevation view of a baby bottle with syringe receiver with cap on;

DETAILED DESCRIPTION OF THE INVENTION

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

In an embodiment, there is provided a bottle which contains liquid milk and dispenses liquid medication, comprising a bottle, wherein the bottle is defined by a cylindrical body with a top end and a bottom end, and wherein the cylindrical body contains a central passage; a cap attached to a nipple, wherein the cap has a top end and a bottom end, wherein the nipple has a tapered end and a non-tapered end, and wherein the non-tapered end of the nipple is attached to the top end of the cap; a sealed vacuum, wherein the sealed vacuum is of conical shape and wherein the sealed vacuum contains a central passage; and a syringe, wherein the syringe is defined by a top tapered end and a bottom end, wherein the syringe lies in the central passage of the bottle, wherein the top tapered end is contained within the mixing chamber of the nipple through the central passage of the sealed vacuum and wherein the bottom end features a plunger.

In an embodiment, there is provided a method for administering medication, the method including: injecting a liquid medication from a central passage of a bottle through an opening of the bottle.

In some embodiments, bottle 100 dispenses a combined liquid and liquid medication. The liquid can be milk, for example.

In some embodiments, bottle 100 provides a less stressful experience for a user (e.g., a user) being medicated where the user may not realize they are being medicated. According to some embodiments, bottle 100 includes a round cavity in a middle where a syringe is positioned to slowly administer medication directly into a common vacuum chamber 124 within the nipple 108 and then the combined medication and milk mixture into a user's mouth, as well as a vacuum chamber 124 that allows for a liquid (such as milk) to not be completely mixed with medication contained in bottle 100. This configuration can prevent the user from tasting the medication being administered and to avoid having the user visually associate the site of a syringe on its own with medication being delivered. Bottle 100 can be configured as a bottle, according to some embodiments.

Figure 1:
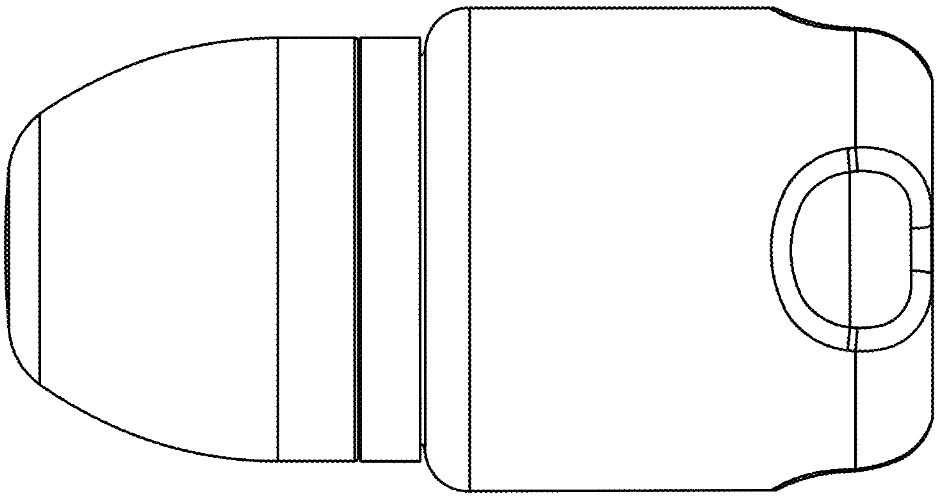
Figure 2:
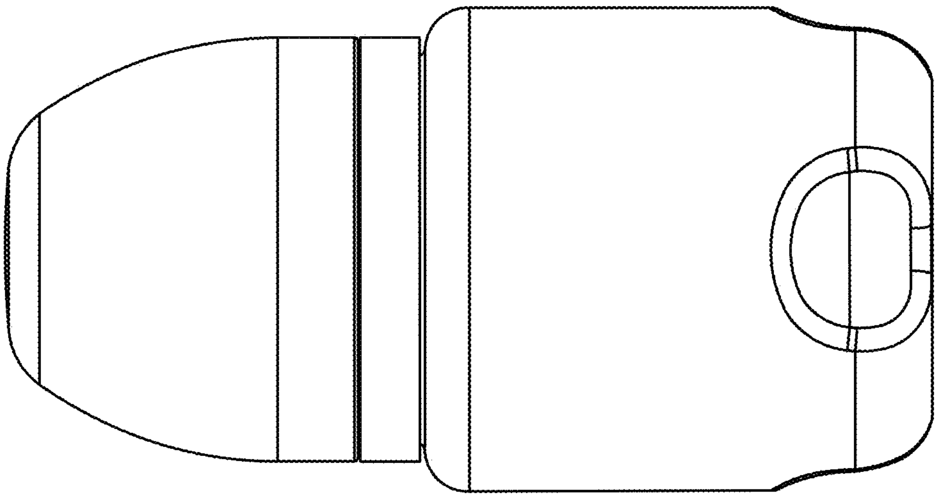
FIG. 2 is a rear elevation view thereof.
Figure 3:
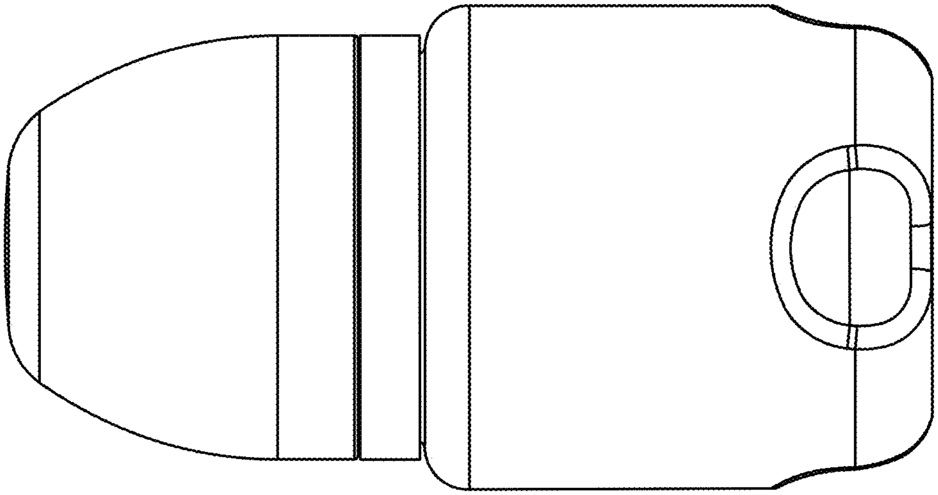
FIG. 3 is a left side elevation view thereof.
Figure 4:
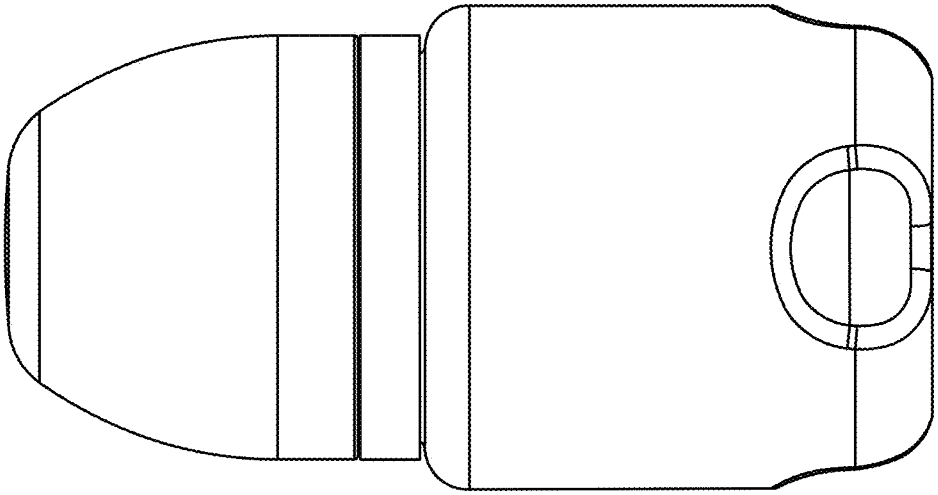
FIG. 4 is a right side elevation view thereof.
Figure 5:
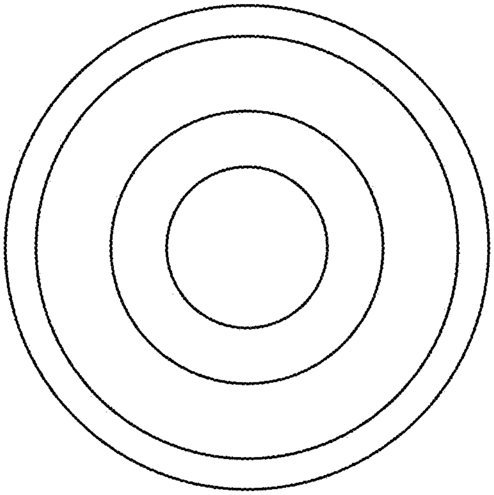
FIG. 5 is a top plan view thereof.
Figure 6:
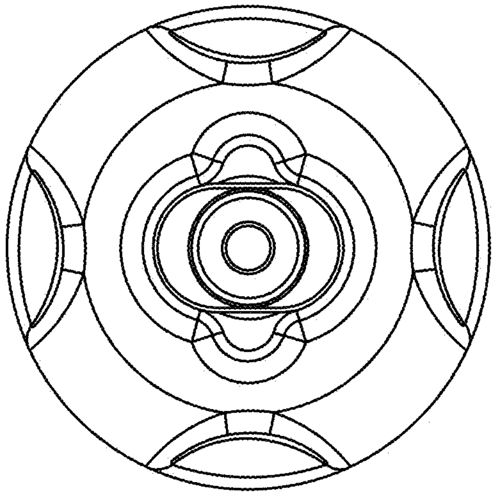
FIG. 6 is a bottom plan view thereof.
Figure 7:
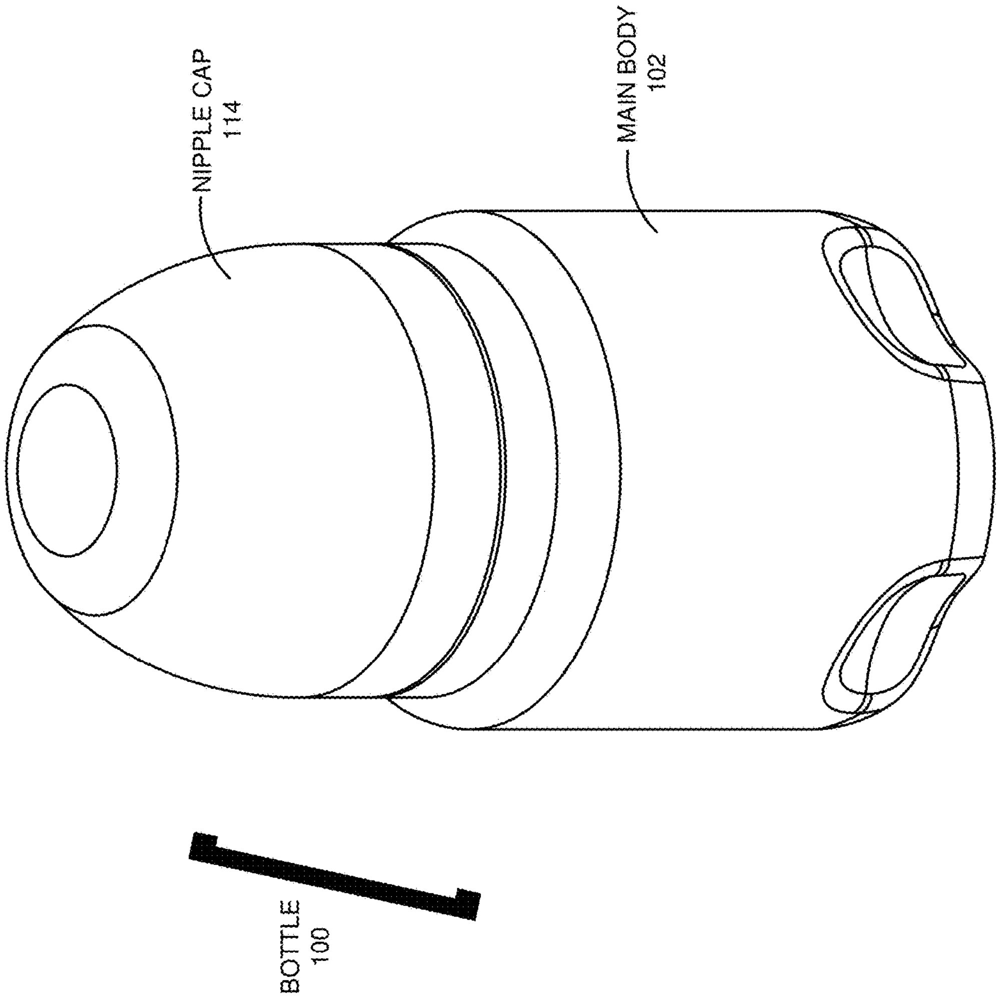
FIG. 7 is an upper isometric perspective view thereof.
Figure 8:
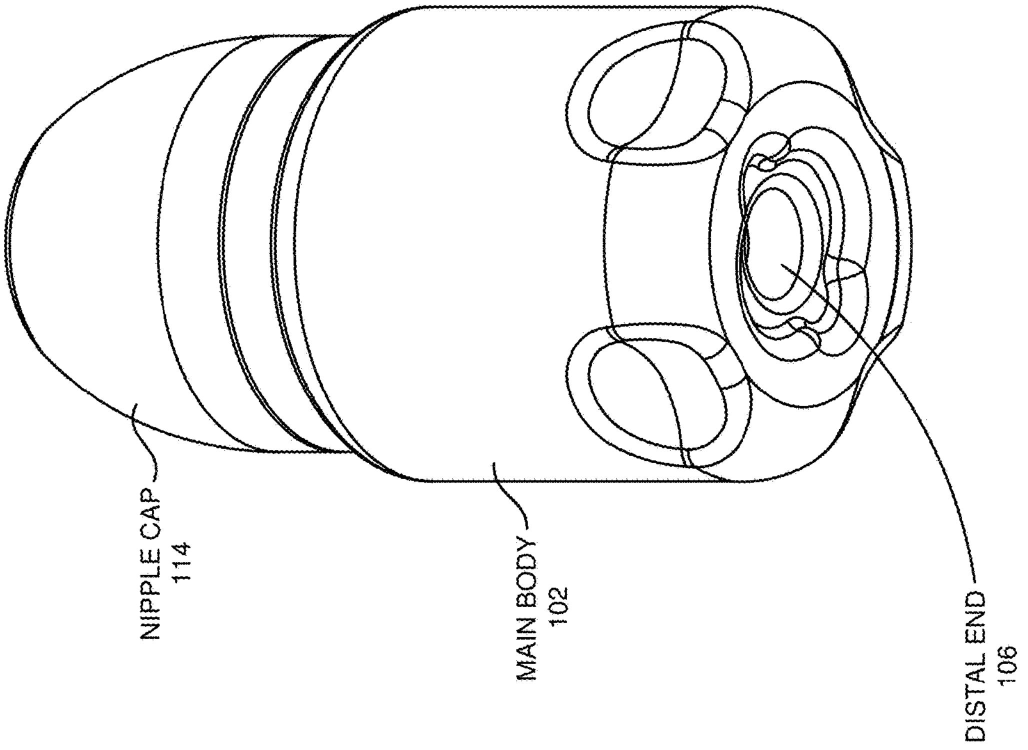
FIG. 8 is a lower isometric perspective view thereof.
Figure 9:
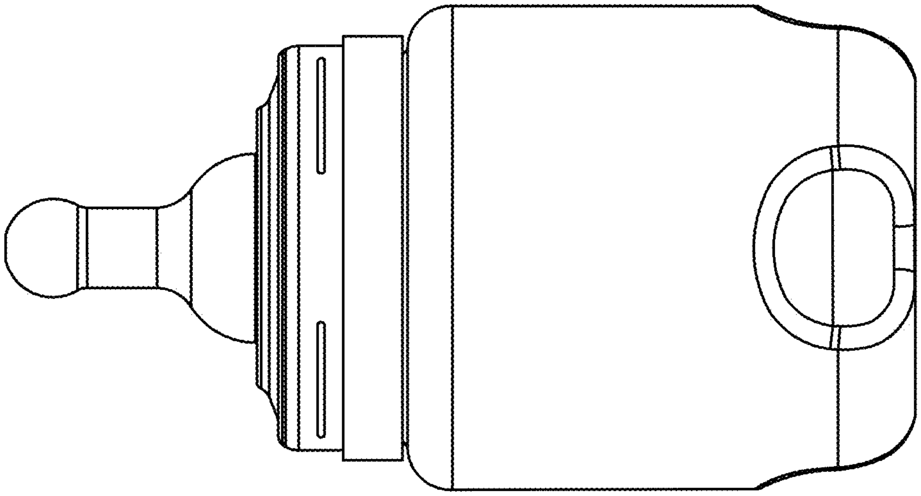
FIG. 9 is a front elevation view of a baby bottle with syringe receiver with cap off.
Figure 10:
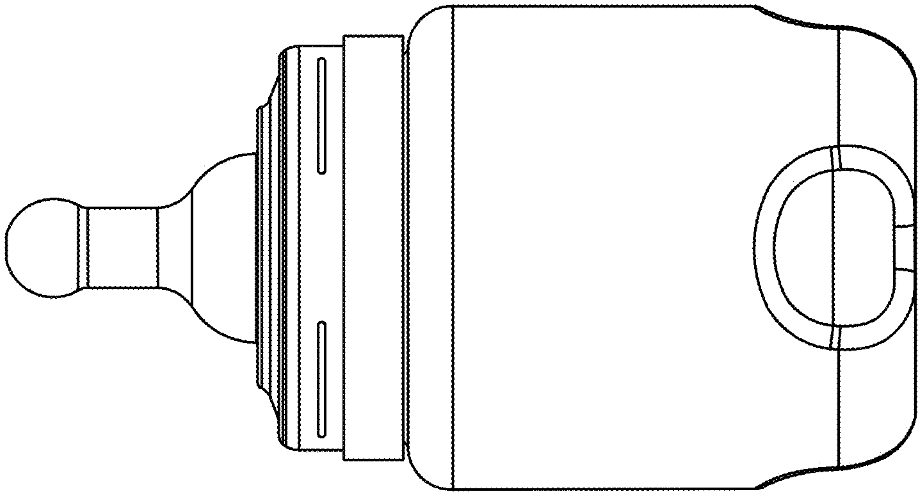
FIG. 10 is a rear elevation view thereof.
Figure 11:
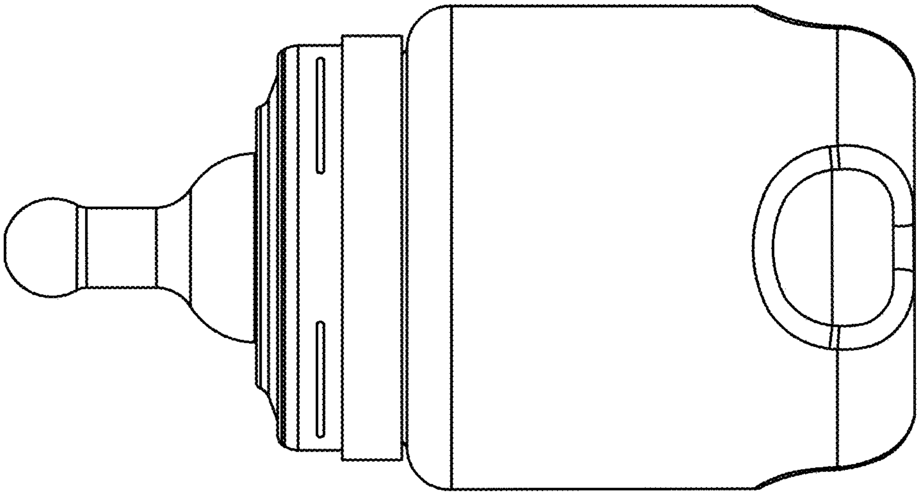
FIG. 11 is a left side elevation view thereof.
Figure 12:
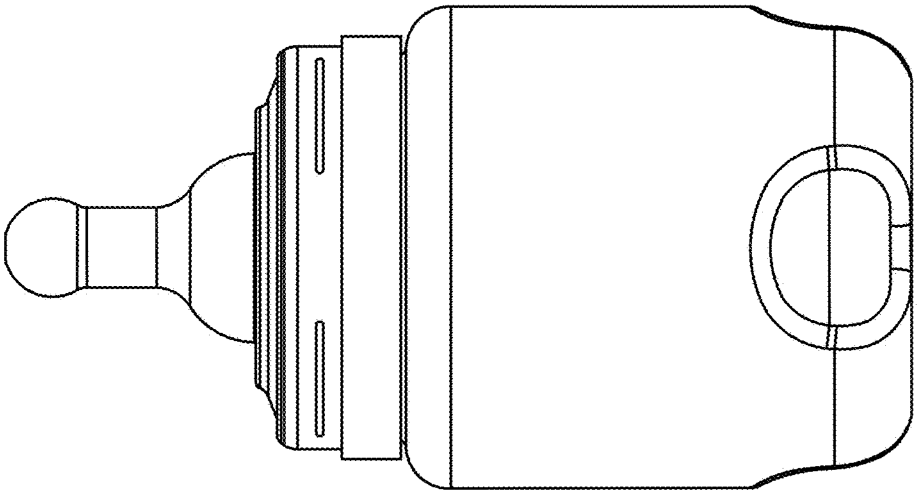
FIG. 12 is a right side elevation view thereof.
Figure 13:
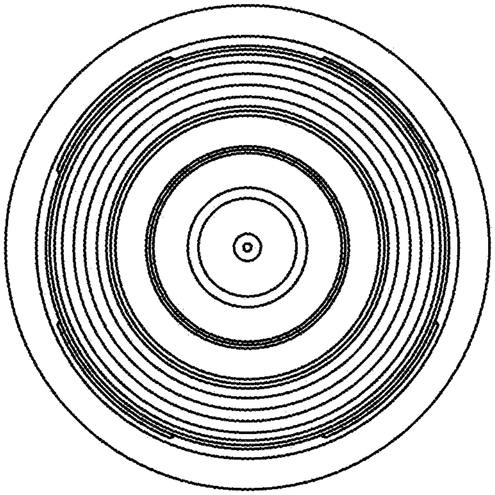
FIG. 13 is a top plan view thereof.
Figure 14:
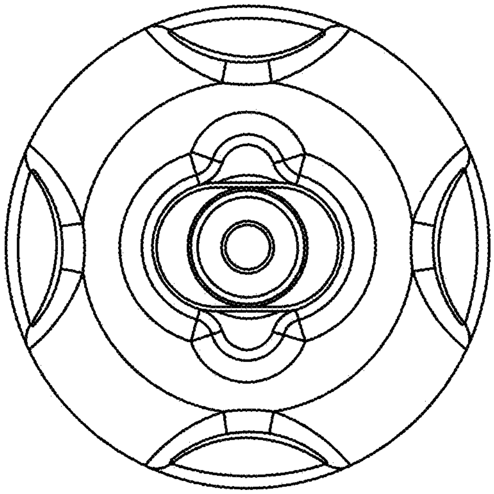
FIG. 14 is a bottom plan view thereof.
Figure 15:
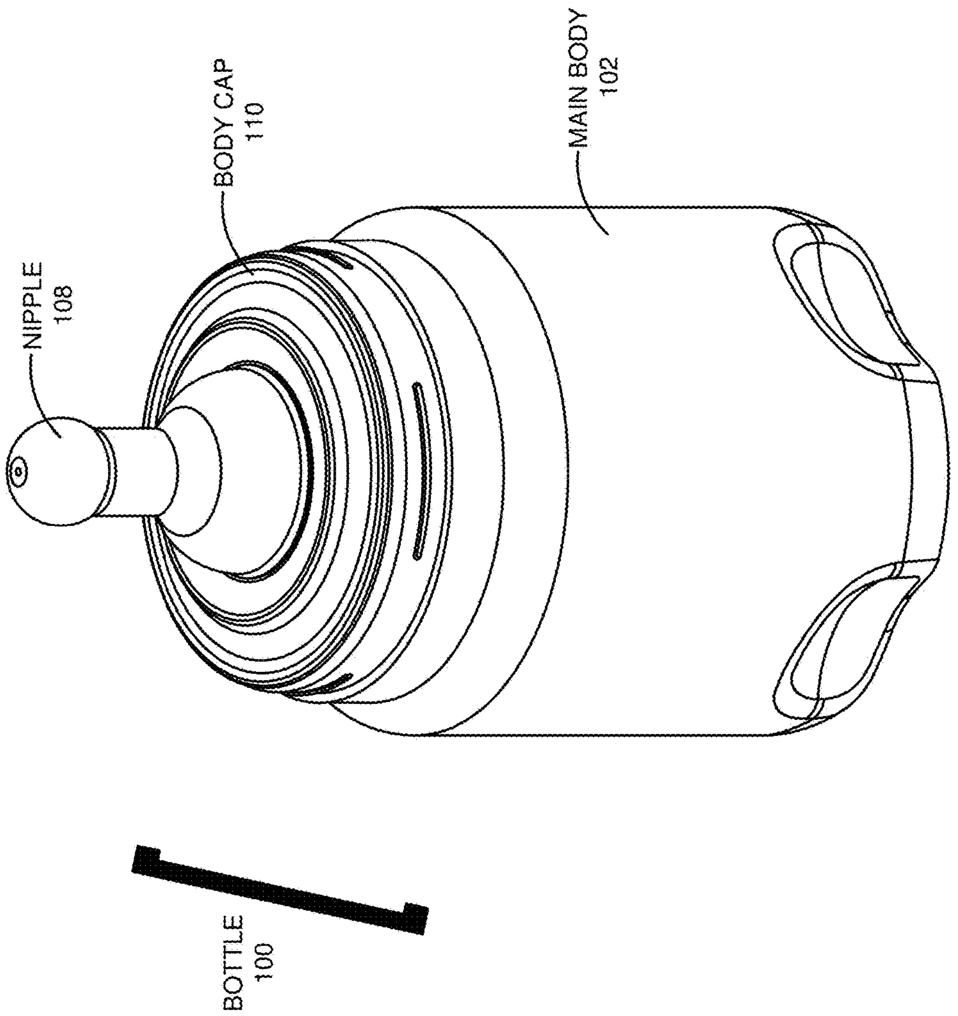
FIG. 15 is an upper isometric perspective view thereof.
Figure 16:
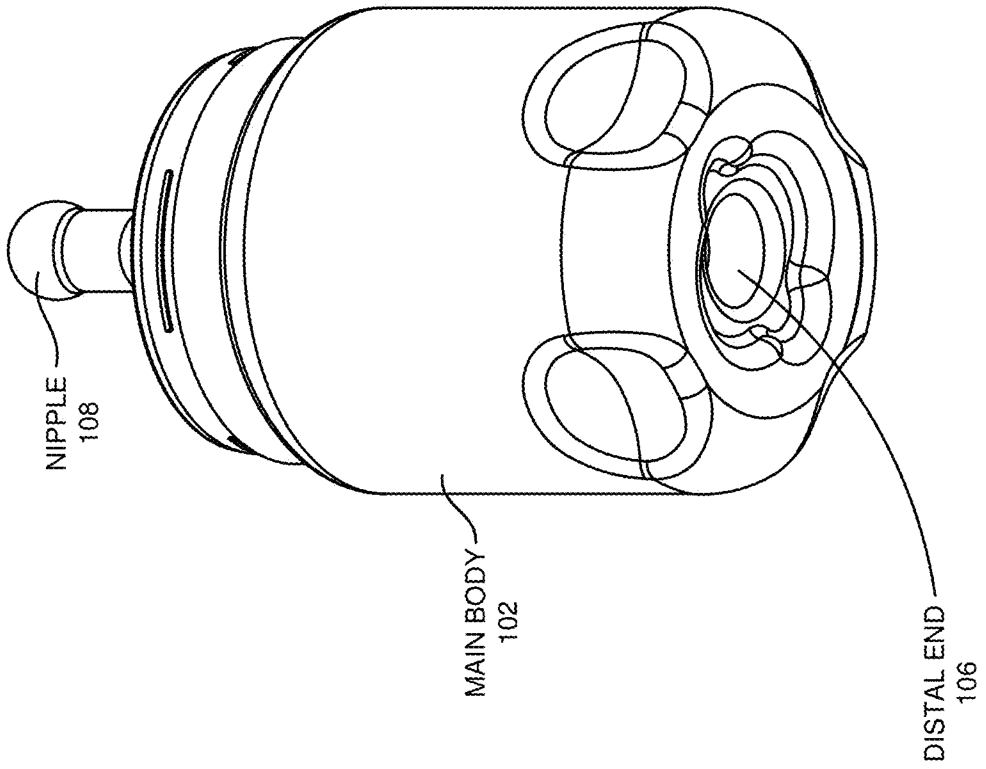
FIG. 16 is a lower isometric perspective view thereof.
Figure 17:
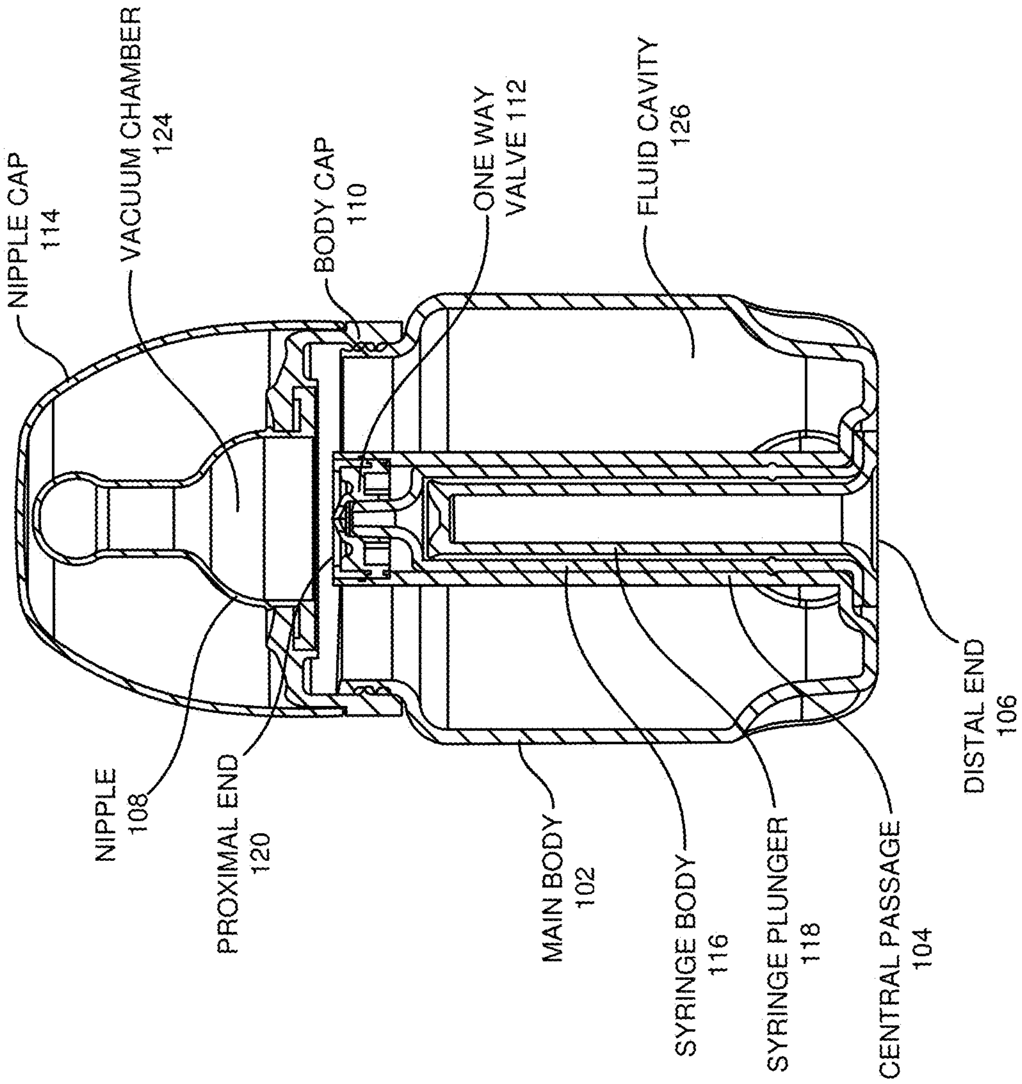
FIG. 17 is a cross-sectional view thereof.
Figure 18:
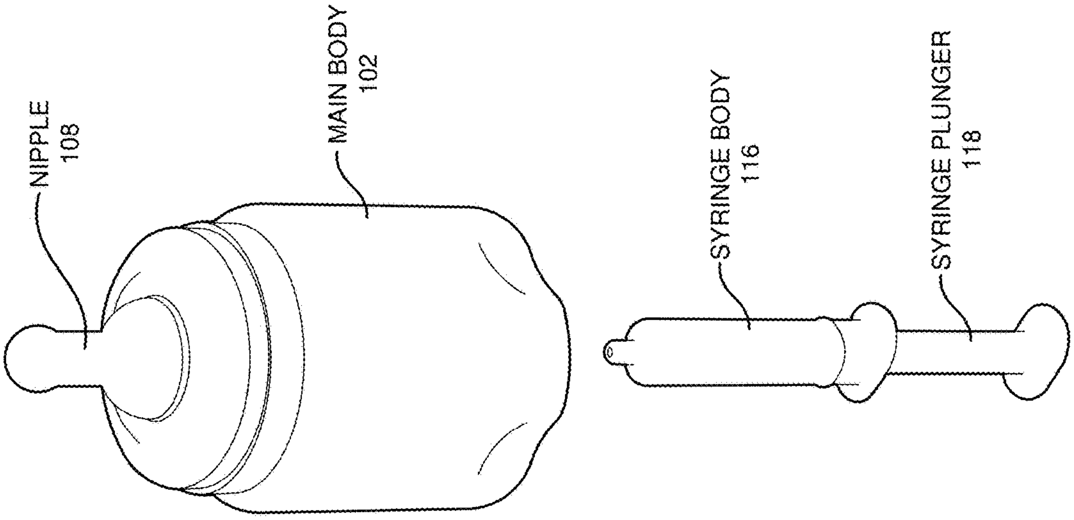
FIG. 18 is an overall perspective view thereof.
Figure 19:
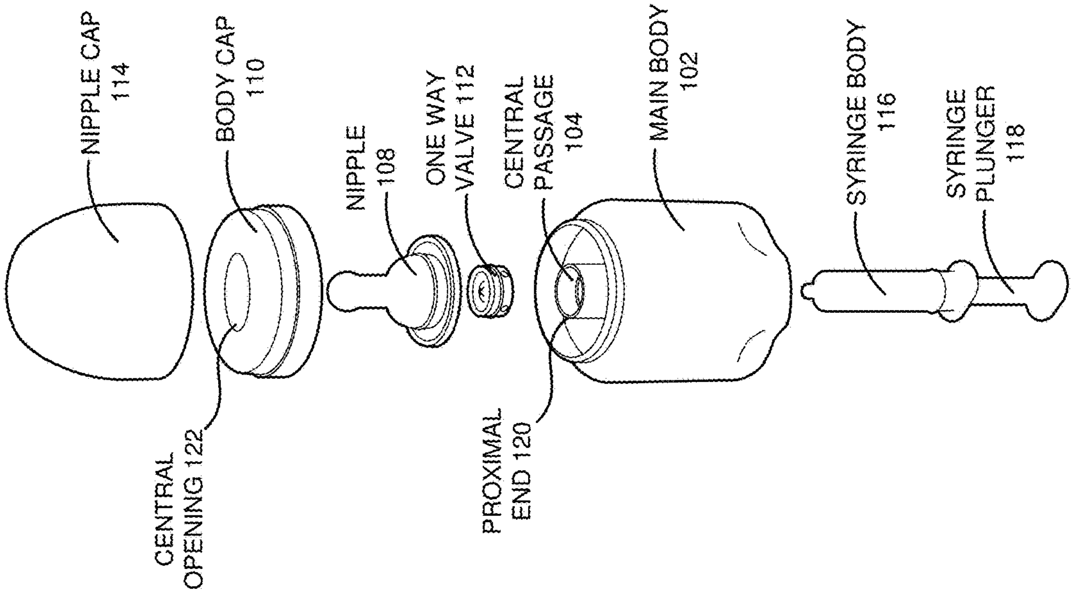
FIG. 19 is an exploded component view thereof.

According to some embodiments as shown in FIGS. 1-19, a bottle 100 includes a main body 102 and a body cap 110 with an attached nipple 108, a syringe body 116 and a one way valve 112. Main body 102 is defined by a bottom end, a top end, and a central passage 104. Main body 102 is cylindrical in shape, in some embodiments. The body cap 110 is defined by a bottom end and a top end. The bottom end of the body cap 110 is attached to the top end of the main body 102 via a twisting motion. The non-tapered end of the nipple 108 is attached to the top end of the cap. The syringe body 116 is defined by a tapered end and a non-tapered bottom end. The syringe body 116 lies in the central passage 104 of the main body 102 such that the length of the syringe is parallel to the length of the bottle in some embodiments, and the top tapered end of the syringe is contained within the tapered end of the nipple 108. In some embodiments, nipple 108 is alternatively configured with an end that is configured to contact a user's mouth and may not be tapered. In some embodiments syringe body 116 is positioned in central passage 104 in a different configuration that may not be parallel to the length of bottle 100 but that operates to contain medication contained within syringe body 116.

According to some embodiments as shown, where bottle 100 is used to administer liquid medication, the syringe body 116 containing the medication is inserted into the central passage 104 of main body 102 such that the top tapered end of the syringe passes through the central passage of the one way valve 112. Syringe body 116 does not reach past the end of the nipple 108 that is configured to contact the user's mouth. The one way valve 112 prevents the substance (e.g., milk) contained in the chamber from coming into contact with liquid medication in the nipple chamber. The medication in the syringe body 116 is not visible when viewed from the perspective of a user using bottle 100. Medication is administered to the user by pushing down on the syringe plunger 118. In some embodiments, other mechanical devices can be used instead of syringe plunger 118. For example, syringe plunger 118 can be substituted for a pusher device, according to some embodiments. Pusher device or syringe plunger 118 can be positioned in a closed position such as where bottle 100 is not used to administer medication via central passage 104.

According to an embodiment shown in FIGS. 1-19, when the bottle 100 is used only to contain a substance in the main body 102, the syringe plunger 118 of the non-tapered bottom end of the syringe body 116 is in contact with the bottom end of the main body 102.

According to a further embodiment, the main body 102 may also be shaped like a sippy cup.

In more detail, the bottle 100 main comprise, generally, a main body 102 having a central passage 104. The main body 102 may further comprise a fluid cavity 126 into which an appropriate fluid may be placed. The central passage 104 may comprise an appropriate passage through the main body 102 into which a syringe body 116 may be inserted. A one way valve 112 may be attached to a proximal end 120 of the central passage 104, and a proximal end of the syringe body 116 may pass through the one way valve 112. In this way any fluids contained within the syringe body 116 may mix with any fluids contained within the fluid cavity 126 of the main body 102 while a user is drinking from the bottle 100.

A nipple 108 may be attached to a proximal end of the main body 102 to facilitate such drinking. The nipple 108 may be attached to the main body 102 by passing through a central opening in a body cap 110. The body cap 110 may be attached to the main body 102 by any appropriate mechanism such as, for example, screwing, snapping, tightening, and the like. A nipple cap 114 may be attached to the body cap 110 when the bottle 100 is not in use to prevent contamination of the nipple 108.

To begin using the device a user may first load an appropriate fluid, such as milk or baby formula, into the main body 102. The user may then pass the nipple 108 through the body cap 110 and attach this combination to the main body 102. The user may then load an appropriate fluid medication into the syringe body 116, and then place the syringe plunger 118 into the syringe body 116. The syringe body 116 may then be inserted into the central passage 104 of the main body 102 such that a tip of the syringe body 116 passes through the one way valve 112. The user may then administer a combination of milk and fluid medication to a second user who is drinking from the bottle 100 by pressing on the syringe plunger 118 during the drinking.

The baby bottle with syringe receiver may be substantially constructed of any suitable material or combination of materials, but typically is constructed of a resilient material or combination of materials such that the device is resistant to damage as a result of compression, twisting, heating, or submersion in water. As an example, and without limiting the scope of the present invention, various exemplary embodiments of the moisture-detecting water source shutoff device may be substantially constructed of one or more materials of steel, aluminum, brass, fiberglass, carbon fiber, plastic, acrylic, polycarbonate, polyester, nylon, denim, cotton, silicone, or combinations thereof. In some embodiments the various components of the device may be coated, lined, or otherwise insulated to prevent contamination of the device. In one embodiment the material of construction may vary from one component to the next within the system.

In one embodiment the baby bottle with syringe receiver may comprise a resilient material of construction that either comprises a material having antimicrobial properties or comprises a layering of antimicrobial material or coating. Antimicrobial properties comprise the characteristic of being antibacterial, biocidal, microbicidal, anti-fungal, antiviral, or other similar characteristics, and the oligodynamic effect, which is possessed by copper, brass, silver, gold, and several other metals and alloys, is one such characteristic. Copper and its alloys, in particular, have exceptional self-sanitizing effects. Silver also has this effect, and is less toxic to users than copper. Some materials, such as silver in its metallic form, may require the presence of moisture to activate the antimicrobial properties.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

I claim:

1. A baby bottle with syringe receiver, comprising:

a main body comprising a fluid container having a central passage to surround a fluid cavity of the main body, wherein the central passage comprises a proximal end and a distal end at an opposite end of the proximal end;

a one way valve attached to the proximal end of the central passage;

a nipple comprising a vacuum chamber to facilitate drinking of a liquid from the fluid cavity of the main body, wherein the vacuum chamber allows for the liquid contained in the fluid cavity of the main body to be mixed with a medication;

a body cap attached to a top end of the main body comprising a central opening to allow the nipple to pass through the body cap; and a syringe body positioned in the central passage, inserted into the distal end of the central passage to allow a tip of the syringe body to pass through the one way valve to administer the medication directly into the vacuum chamber within the nipple combined with the liquid from the fluid cavity of the main body to deliver into a user's mouth via the nipple when a syringe plunger positioned inside the syringe body is pushed down.

2. The baby bottle with syringe receiver of claim 1, further comprising:

a nipple cap attached to the body cap of the main body when the baby bottle with syringe receiver is not in use to prevent contamination.

3. A method of using a baby bottle with syringe receiver, comprising:

placing a fluid into a main body comprising a fluid container having a central passage to surround a fluid cavity of the main body, wherein the central passage comprises a proximal end and a distal end at an opposite end of the proximal end;

inserting a nipple through a body cap to create a nipple cap combination, wherein the nipple comprises a vacuum chamber to facilitate drinking of the fluid from the fluid cavity of the main body, wherein the vacuum chamber allows for the fluid contained in the fluid cavity of the main body to be mixed with a fluid medication;

attaching the nipple cap combination to the main body;

placing the fluid medication into a syringe body;

inserting a syringe plunger into the syringe body to create a syringe combination;

inserting the syringe combination into the distal end of the central passage of the main body; and combining the fluid with the fluid medication by pressing on the syringe plunger to administer the medication directly into the vacuum chamber within the nipple combined with the fluid from the fluid cavity of the main body to deliver into a user's mouth via the nipple when the syringe plunger positioned inside the syringe body is pushed down.

* * * * *